(12) United States Patent
Ishida (10) Patent No.: US 9,244,298 B2
(45) Date of Patent: Jan. 26, 2016

(54) LIQUID CRYSTAL DISPLAY DEVICE (75) Inventor: Hiroshi Ishida, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 410 days.

(21) Appl. No.: 12/705,546

(22) Filed: Feb. 12, 2010

(65) Prior Publication Data

US 2010/0201908 A1    Aug. 12, 2010

(30) Foreign Application Priority Data

Feb. 10, 2009  (JP) ................. 2009-027964
Dec. 11, 2009  (JP) ................. 2009-281080

(51) Int. Cl.
*G02F 1/1333*  (2006.01)

(52) U.S. Cl.
CPC ............. *G02F 1/133308* (2013.01); *G02F 2001/133317* (2013.01); *G02F 2001/133322* (2013.01)

(58) Field of Classification Search
CPC ............ G02F 2201/503; G02F 2001/133317; G02F 2001/133314; G02F 1/133308; G02F 2001/133322
USPC .................................. 349/58–60
See application file for complete search history.

(56) References Cited

U.S. PATENT DOCUMENTS

2005/0212991 A1*  9/2005  Sugawara .................. 349/58
2008/0055834 A1*  3/2008  Matsuzaki et al. ........ 361/681
2008/0291354 A1* 11/2008  Oh ............................. 349/58
2009/0103002 A1*  4/2009  Enomoto .................... 349/60
2009/0195727 A1   8/2009  Matsuzaki et al.

FOREIGN PATENT DOCUMENTS

| CN | 101135793 | 3/2008 |
|---|---|---|
| JP | 4-81117 | 7/1992 |
| JP | 08-179283 | 7/1996 |
| JP | 09-022000 | 1/1997 |
| JP | 10-206828 | 8/1998 |
| JP | 11-305206 | 11/1999 |
| JP | 2000-019529 | 1/2000 |
| JP | 2005-091971 | 4/2005 |
| JP | 2005-275103 | 10/2005 |
| JP | 2008-164687 | 7/2008 |

OTHER PUBLICATIONS

CN Office Action dated Dec. 24, 2012, with English Translation; Application No. 201010113250.8.
JP Office Action dated May 7, 2013, with partial English translation; Application No: 2009-281080.

* cited by examiner

*Primary Examiner* — Jessica M Merlin
(74) *Attorney, Agent, or Firm* — Young & Thompson (57) ABSTRACT

A liquid crystal display device includes a liquid crystal (LC) panel; front and rear frames sandwiching therebetween the LC panel; a latch structure engaging together the LC panel and one of the front and rear frames. The latch structure includes a convex portion formed on one of the LC panel and the one of the front and rear panels and a concave portion formed on the other of the LC panel and the one of the front and rear frames to receive therein the convex portion, whereby the latch structure allows and restricts movement of the LC panel with respect to the one of the front and rear frames in a first direction normal to the LC panel and in a second direction parallel to the LC panel, respectively.

27 Claims, 7 Drawing Sheets

LIQUID CRYSTAL DISPLAY DEVICE

This application is based upon and claims the benefit of priority from Japanese patent applications No. 2009-027964 filed on Feb. 10, 2009, and No. 2009-281080 filed on Dec. 11, 2009, the disclosure of which is incorporated herein in its entirety by reference.

TECHNICAL FIELD

The present invention relates to a liquid crystal display (LCD) device and, more particularly, to an LCD device including a liquid crystal (LC) panel and front and rear frames that sandwich therebetween the LC panel.

BACKGROUND ART

An LCD device includes an LC panel, a backlight unit that irradiates the LC panel from the rear side, and front and rear frames that sandwich therebetween the LC panel. The rear frame supports the backlight unit and may be referred to as backlight chassis. The front frame is disposed in front of the LC panel, and supports the LC panel between the same and the rear frame.

In the LCD device, there is a risk that dust enters through a gap between the LC panel and the front and rear frames to degrade the image quality of the LCD device. Thus, it is needed to provide a structure that prevents the ingress of dust into the LCD device.

Patent Publication-1 describes an LCD device including the structure for preventing the ingress of dust, wherein an elastic spacer is sandwiched between the LC panel and the rear frame. The spacer is made of a soft, elastic urethane foam etc., and has a front surface in contact with the LC panel and a rear surface in contact with the rear frame.

Patent Publication-2 describes an LCD device including an elastic body that supports the LC panel at the rear side thereof. The elastic body has a pointed top that contacts the LC panel, and deforms due to the weight of the LC panel to thereby clog the gap between the LC panel and the elastic body by the repulsive force thereof.

Patent Publication-3 describes an LCD device that includes an elastic member disposed between the LC panel and a mold body configuring the backlight unit. The elastic member has a rear surface attached onto the backlight unit and a front surface in contact with the LC panel at any time, thereby preventing generation of a gap between the LC panel and the elastic member.

Patent Publication-4 describes an LCD device that includes a groove formed on the rear frame and a spacer received in the groove. The spacer is an elastic member of a ring shape or annular shape and supports the LC panel. The spacer is deformed due to the weight of the LC panel to clog the gap between the LC panel and the elastic member rear frame by the repulsive force thereof.

Patent Publication-5 describes an LCD device that includes a groove on the rear frame and a ring-shaped elastic body received in the groove. The elastic body clogs the gap between the LC panel and the rear frame, and at the same time reduces a shock or vibration transferred to the LC panel.

Patent Publication-6 describes an LCD device that includes an LC panel including top and bottom substrates and a spacer for fixing together the front frame having a narrow width and the LC panel. The spacer is fixed onto the front frame or a marginal space of the bottom substrate that protrudes from the top substrate.

The Patent Publications as recited above include:
Patent Publication-1—JP-2000-19529A;
Patent Publication-2—JP-2005-91971A;
Patent Publication-3—JP-2005-275103A;
Patent Publication-4—JP-1998-206828A;
Patent Publication-5—JP-1997-22000A; and
Patent Publication-6—JP-1999-305206A.

The following is the analysis performed by the present inventor before accomplishment of the present invention. There is no recitation in Patent Publication-1 as to whether or not the elastic body disposed between the LC panel and the rear frame in the LCD device is fixed onto either of the LC panel and rear frame. In this case, if the elastic body is not fixed onto at least one of the LC panel and rear frame, the LCD device is liable to the ingress of dust after the LC panel moves in the direction normal to the LC panel, i.e., screen. On the other hand, if the elastic body is fixed onto both LC panel and rear frame, a stress acting on the LC panel and/or rear frame due to a strain or deformation cannot be relieved, thereby possibly causing the LC panel to generate disturbance of light distribution and have a reduced image quality.

In the LCD devices described in Patent Publications-2 to -4, the elastic body is deformed to contact the LC panel due to the repulsion force of the elastic body. This causes acting of a shock or vibration onto the LCD device, and if the LC panel moves in the direction normal to the screen, a gap is momentarily formed between the elastic body and the LC panel, thereby causing the ingress of dust. Moreover, a distortion of parts during assembly of the parts or a deformation of the parts due to a heat stress, if arises, will also cause the occurrence of a gap between the elastic body and the LC panel. Furthermore, a particular shape of the elastic body for preventing the ingress of dust, if employed as in the LCD device described in Patent Publication-2, will reduce the elasticity or flexibility of the elastic body due to the time degradation, to deform the pointed shape of the elastic body and possibly degrade the dimensional accuracy. In this case, a clearance between the parts may be changed to generate the gap, thereby degrading the performance of preventing the ingress of dust.

Furthermore, the range of variation in the dimensional accuracy of the parts as well as the distortion occurring during assembly of the parts may reduce the clearance between the rear frame and the LC panel or may increase the thickness of the elastic body itself, thereby increasing the load acting on the LC panel from the elastic body. In such a case, the LC panel may generate a disturbance of light distribution to degrade the image quality thereof. Although Patent Publication-4 recites that the spacer is disposed within the groove formed on the rear frame, this groove only assists assembly of the ring-shaped spacer to facilitate assembly of the LCD device.

Although Patent Publication-5 describes a groove formed on the rear frame, it is not disclosed that a shock or vibration is applied onto the LCD device, and that a momentary gap occurs between the LC panel and the elastic body.

The LCD device described in Patent Publication-6 uses the spacer for fixing together the front frame having a narrow width and the LC panel. However, prevention of the ingress of dust onto the front surface or rear surface of the LC panel is not disclosed in this publication. This means the dust will enter the LCD device across the surface of the spacer that is not fixed by adhesive.

SUMMARY OF THE INVENTION

It is therefore an object of the present invention to provide an LCD device that is capable of preventing the ingress of dust that causes degradation of the image quality.

The present invention provides, in a first aspect thereof, an LCD device including: a liquid crystal panel; front and rear frames sandwiching therebetween the LC panel; at least one latch structure engaging together the LC panel and one of the front and rear frames, wherein the latch structure includes a convex portion fixed onto a surface of one of the LC panel and the one of the front and rear panels and a concave portion formed on an opposing surface of the other of the LC panel and the one of the front and rear frames to receive therein the convex portion, whereby the latch structure allows and restricts movement of the LC panel with respect to the one of the front and rear frames in a first direction normal to the LC panel and in a second direction parallel to the LC panel, respectively.

The present invention provides, in a second aspect thereof, an LCD device including: an LC panel; front and rear frames sandwiching therebetween the LC panel; at least one latch structure engaging together the LC panel and one of the front and rear frames, wherein the latch structure includes a convex portion fixed onto a surface of one of the LC panel and the one of the front and rear panels and a concave portion formed on an opposing surface of the other of the LC panel and the one of the front and rear frames to receive therein the spacer, and a length of a part of the convex portion received in the concave portion as viewed in a first direction normal to the LC panel is longer than an offset distance between the LC panel and the other of the front and rear frames.

The above and other objects, features and advantages of the present invention will be more apparent from the following description, referring to the accompanying drawings.

DETAILED DESCRIPTION OF THE INVENTION

Before describing embodiments of the present invention, the principle of the present invention will be described for a better understanding of the present invention.

The LCD device according to the first aspect of the present invention includes: an LC panel; front and rear frames sandwiching therebetween the LC panel; at least one latch structure engaging together the LC panel and one of the front and rear frames, wherein the latch structure includes a convex portion fixed onto a surface of one of the LC panel and the one of the front and rear panels and a concave portion formed on an opposing surface of the other of the LC panel and the one of the front and rear frames to receive therein the convex portion, whereby the latch structure allows and restricts movement of the LC panel with respect to the one of the front and rear frames in a first direction normal to the LC panel and in a second direction parallel to the LC panel, respectively.

In the LCD device according to the first aspect of the present invention, the latch structure wherein the convex portion is engaged with the concave portion stops the ingress of dust that enters through the gap between one of the front and rear frames and the LC panel, thereby preventing degradation of the image quality of the LCD device caused by the dust. In addition, the latch structure that allows the relative movement of the LC panel with respect to the front frame or rear frame alleviates the influence exerted on the LC panel by a distortion of the rear frame or front frame. Thus, the LC panel is substantially free from the disturbance of light distribution in the LC layer caused by the distortion, thereby preventing degradation of the image quality as well.

The LCD device according to a second embodiment of the present invention includes: an LC panel; front and rear frames sandwiching therebetween the LC panel; at least one latch structure engaging together the LC panel and one of the front and rear frames, wherein the latch structure includes a convex portion fixed onto a surface of one of the LC panel and the one of the front and rear panels and a concave portion formed on an opposing surface of the other of the LC panel and the one of the front and rear frames to receive therein the spacer, a length of a part of the convex portion received in the concave portion as viewed in a first direction normal to the LC panel is longer than an offset distance between the LC panel and the other of the front and rear frames.

In the LCD device according to the second aspect of the present invention, the latch structure, wherein the length of a part of the convex portion received in the concave portion as viewed in the direction normal to the screen of the LC panel is longer than the offset distance between the LC panel and the other of the front frame and rear frame, allows the convex portion to engage with the concave portion at any time even if the LC panel moves in the direction normal to the screen, thereby preventing the ingress of dust.

The LCD device of the present invention may have a configuration wherein the concave portion is a groove that is a continuous, discrete or endless groove formed on the surface of the other of the liquid crystal panel and the one of the front and rear panels, and the convex portion is a spacer having a shape corresponding to the groove. This configuration simplifies the latch structure for preventing the ingress of dust.

The LCD device of the present invention may have a configuration wherein a gap is formed between the liquid crystal panel and the one of the front and rear panels when a top of the convex portion abuts a bottom surface of the groove. In this configuration, the LC panel is supported by the latch structure whereby distortion of the LC panel can be alleviated.

The LCD device of the present invention may have a configuration wherein the convex portion has a tapered rear surface wherein the thickness of the convex portion reduces from the outer periphery to the inner periphery thereof. In this configuration, the frictional force between the convex portion and the concave portion can be alleviated upon a movement of the LC panel in the direction normal to the LC panel, thereby preventing a distortion or damage on the LC panel.

The LCD device of the present invention may have a configuration wherein a gap is formed between the liquid crystal panel and the other of the front and rear panels when a top of the convex portion abuts a bottom surface of the groove. The latch structure allows the movement of the LC panel in the direction normal thereto.

The LCD device of the present invention may have a configuration wherein at least one of the convex portion and a member that configures the concave portion is made of an elastic material. In this configuration, a stress concentration occurring in the LC panel can be reduced.

The LCD device of the present invention may have a configuration wherein a top of the convex portion abuts a bottom surface of the groove, and the liquid crystal panel abuts the one of the front and rear frames. In this configuration, the area by which the LC panel is supported can be increased. This alleviates localization of the stress acting on the LC panel, thereby preventing occurrence of an uneven image. In addition, the increase of the area supporting the LC panel prevents a warp of the LC panel.

The LCD device of the present invention may have a configuration wherein a gap is formed between a rear surface of the spacer and a bottom surface of the concave portion when the liquid crystal panel abuts the one of the front and rear frames. In this configuration, the LC panel can be supported by the front frame or rear frame with a higher dimensional accuracy.

The LCD device of the present invention may have a configuration wherein the at least one latch structure include a plurality of latch structures arranged in a direction from a center of the liquid crystal panel toward a periphery thereof. In this configuration, a higher performance of preventing the ingress of dust can be obtained.

The LCD device of the present invention may have a configuration wherein the liquid crystal panel includes an optical film disposed on at least one of front and rear surfaces thereof, the concave portion is a groove formed on the optical film, and the convex portion is a spacer fixed onto the one of the front and rear frames. This configuration facilitates the process of forming the concave portion. The optical film can use a polarizing film or other optical film or films.

The LCD device of the present invention may have a configuration wherein the at least one latch structure include a first latch structure formed between the liquid crystal panel and one of the front and rear frames and a second latch structure formed between the liquid crystal panel and the other of the front and rear frames. In this configuration, a higher performance of preventing the ingress of dust can be obtained.

Now, exemplary embodiments of the present invention will be described with reference to accompanying drawings, wherein similar constituent elements are designated by similar reference numerals throughout the drawings.

First Embodiment

Figure 1A:
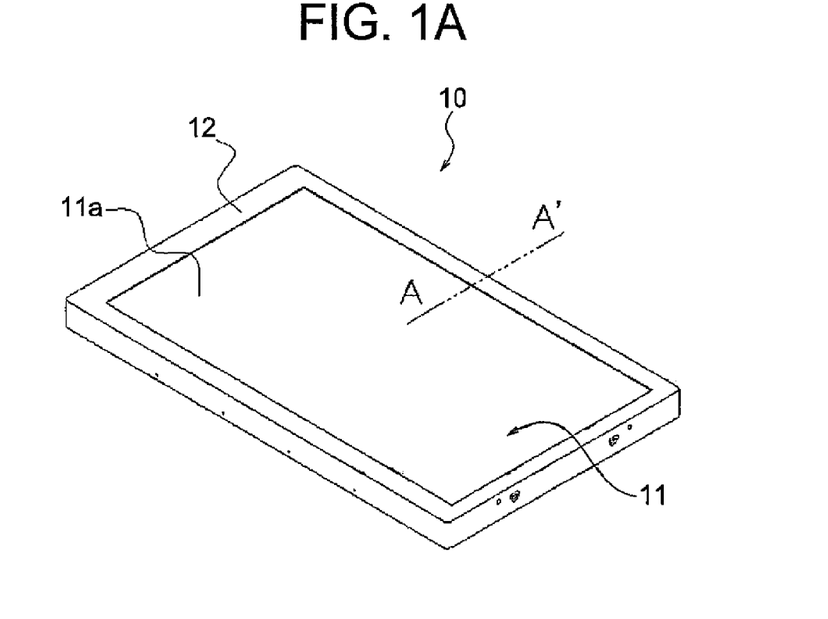
FIGS. 1A and 1B are an overall perspective view and an exploded perspective view, respectively, of an LCD device according to a first embodiment of the present invention.
Figure 1B:
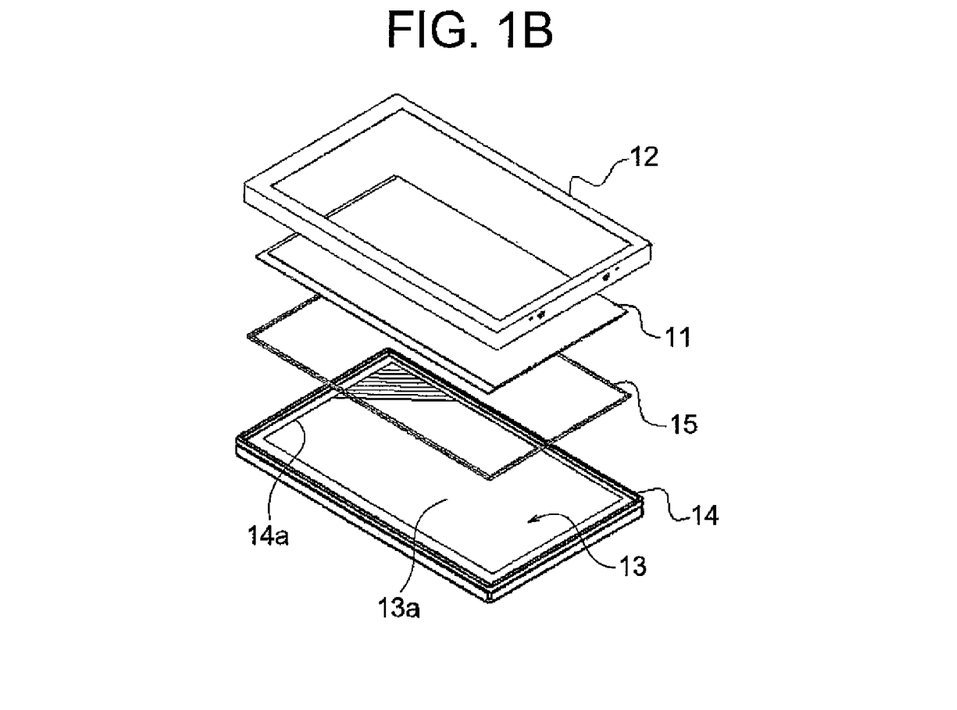

FIG. 1A is a perspective view of showing the overall structure of an LCD device according to a first embodiment of the present invention, whereas FIG. 1B is an exploded view of the LCD device of FIG. 1A. The LCD device, i.e., LCD module 10 includes an LC panel 11, a front frame 12, a backlight unit 13, a rear frame 14 which is also referred to as backlight chassis, and a spacer 15 which is also referred to as convex portion. The front frame 12 is of a rectangular shape, and covers the periphery of the LC panel 11 on the front surface or display screen of the LC panel 11. The front frame 12 and the rear frame 14 sandwich therebetween the LC panel 11 for supporting the same. The backlight unit 13 has thereon an irradiation surface 13a that irradiates the LC panel 11 at the rear surface thereof. The light source of the backlight unit 13 may be a cold cathode, a light emitting diode (LED) or another surface-emission source, and is not limited to any type or principle of emission.

The rear frame 14 is a rectangular frame, and covers and supports the periphery of the backlight unit 13. The rear frame 14 and the LC panel 11 sandwich therebetween the spacer 15. The rear frame 14 has an inner periphery 14a of the frame that is larger than the outer periphery of the display screen 11a of the LC panel 11, and an outer periphery that is larger than the outer periphery of the LC panel 11. It is to be noted that the rear frame 14 may be joined with the backlight unit 13 to form a unitary body of the backlight unit, or may be separate from the backlight unit 13. In the latter case, the rear frame 14 may be referred to as an intermediate frame that is sandwiched and supported between the backlight unit 13 and the LC panel 11.

Figure 2A:
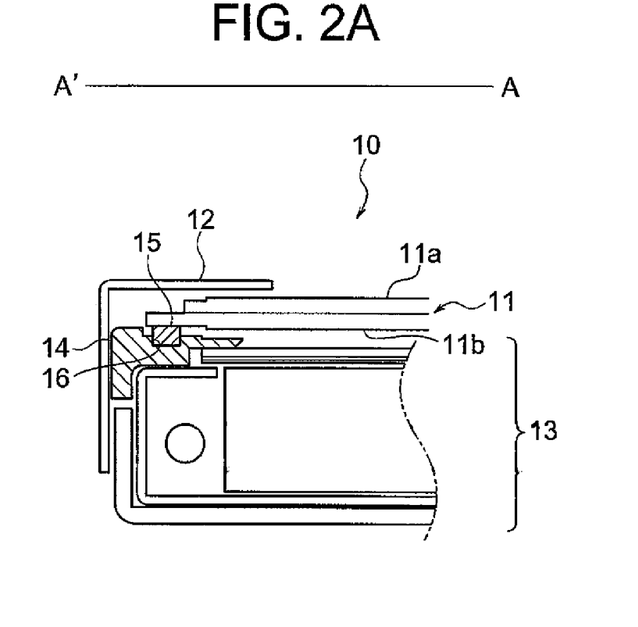
FIG. 2A is a partial cross-sectional view of the LCD device of the first embodiment taken long line A-A' in FIG. 1A.
Figure 2B:
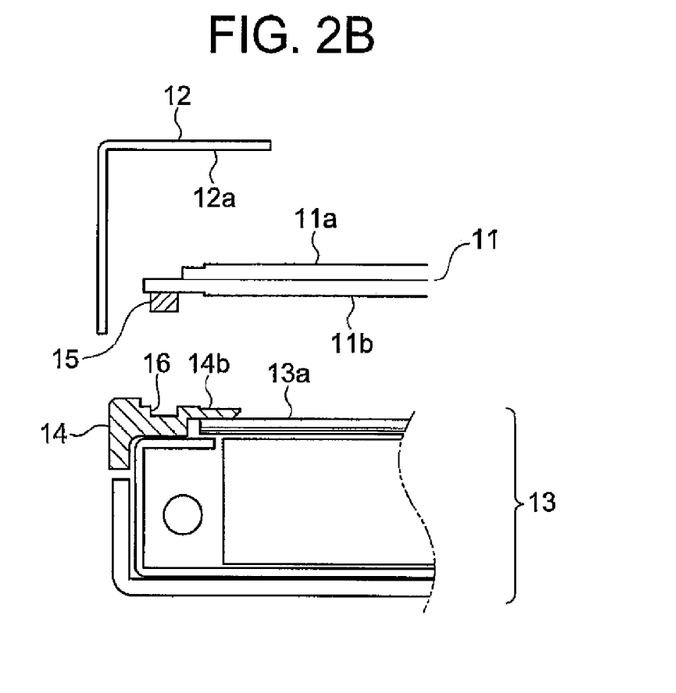
FIG. 2B is an exploded view of the structure shown in FIG. 2A.
Figure 3:
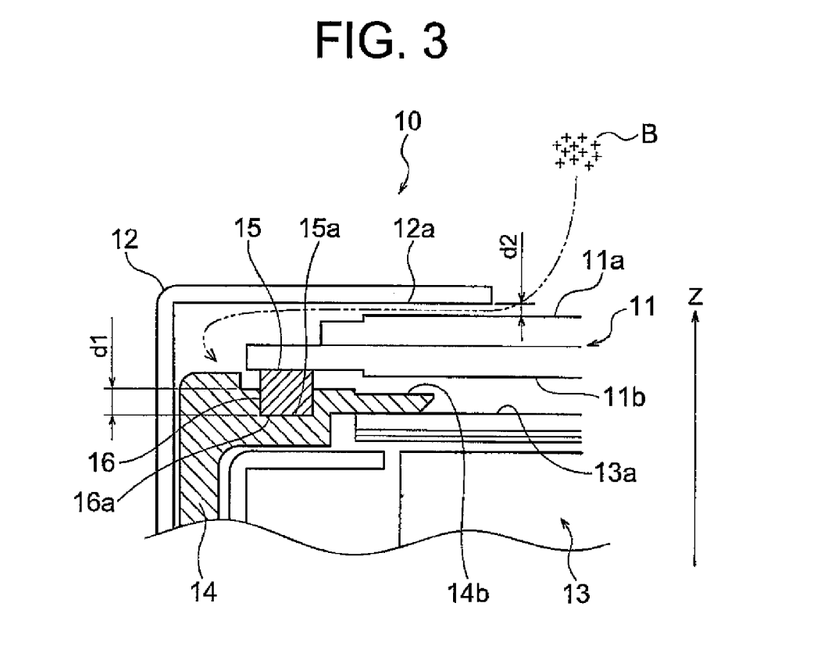
FIG. 3 is an enlarged partial cross-sectional view of the part of FIG. 2A.

The internal structure of the LCD device 10 will be described hereinafter with reference to FIGS. 2A, 2B and 3. FIG. 2A is a partial cross-sectional view of the LCD device 10 taken along line A-A' in FIG. 1A, and FIG. 2B is an exploded view of the part of LCD device 10 shown in FIG. 2A. FIG. 3 is an enlarged partial cross-sectional view of the part of LCD device 10 shown in FIG. 2A. The spacer 15 is fixed onto the rear surface of the LC panel 11, and configures a stripe convex portion formed on the periphery of the LC panel 11. In FIG. 2B, the rear frame 14 has a front surface 14b that opposes the rear surface 11b of the LC panel 11, and includes a groove 16 extending on the front surface 14b of the rear frame 14 for receiving the spacer 15. FIG. 2B shows that the spacer 15 is fixed onto the rear surface 11b of the LC panel 11, and FIG. 3 shows that the groove 16 receives therein the spacer 15 for engagement of the LC panel 11 with respect to the rear frame 14. The groove 16 and spacer 15 in combination configure a latch structure.

The spacer 15 is not fixed onto the wall or bottom surface of the groove 16 as by a double-sided tape or adhesive. Thus, when the LCD device 10 is applied with an external force, the relative position of the spacer 15 with respect to the groove 16 can be changed. More specifically, the latch structure allows the relative movement of the LC panel 11 with respect to the rear frame 14 in the direction normal to the screen of the LC panel 11, and restricts the relative movement of the LC panel 11 in the direction parallel to the screen. Although the latch structure is provided between the LC panel 11 and the rear frame 14 in the present embodiment, the latch structure may be provided between the LC panel 11 and the front frame 12.

Figure 11:
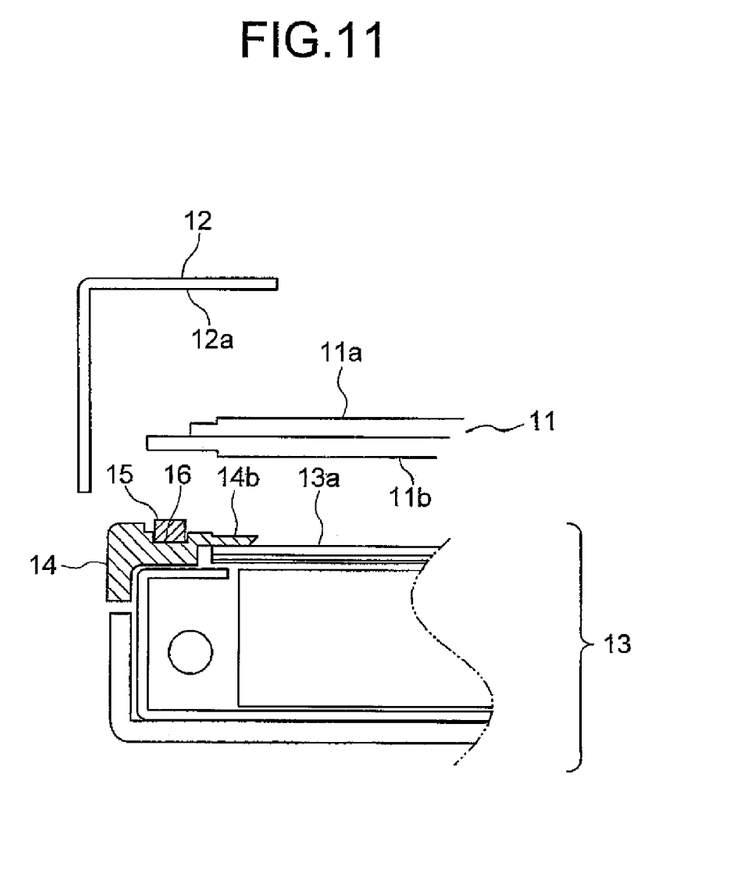
FIG. 11 is a cross-sectional view similar to FIG. 2A before assembly of the parts shown in FIG. 2A.

The spacer 15 may have any configuration so long as the spacer 15 is fixed onto the LC panel 11 and received in the groove 16. As an example, the spacer 15 may be fixed onto the LC panel 11 as by a double-sided tape or adhesive. The spacer 15 may be fixed onto the LC panel 11 by forming an extremely smooth surface on both the spacer 15 and LC panel 11, and allowing both the smoothed surfaces to fix each other by absorption. FIG. 11 shows an example for fixing the spacer 15 onto the LC panel 11. In FIG. 11, the spacer 15 having a front surface applied with adhesive is first received in the groove 16, followed by mounting the LC panel onto the front surface of the spacer 15 for assembly. This technique allows an accurate alignment of the spacer 15 with the LC panel 11 after the bonding. The rear surface of the spacer 15 in FIG. 11 may be referred to as top surface of the convex portion after the spacer 15 is fixed onto the LC panel 11. In an alternative of the process shown in FIG. 11, the LC panel 11 may be provided with an attachment having a shallow groove that can receive a part of the spacer 15, and the spacer 15 is fixed onto the attachment by using adhesive. In a further alternative, the body of the LC panel 11 may be formed to have thereon a convex portion on the surface thereof.

The groove 16 may extend on the rear frame 14 along the entire periphery of the LCD device 10 to form an endless groove or continuous groove, or may extend along some part of the periphery, through which the dust may easily enter the LCD device, to form a discrete or continuous groove. The rear frame 14 may be made from any material such as resin, metal and alloy.

The latch structure will be described in detail with reference to FIG. 3. In FIG. 3, the spacer 15 is received in the groove 16 for engagement, wherein the rear surface of the spacer 15, i.e., the top surface of the convex portion, abuts the bottom surface of the groove 16. The length d1 denotes the distance by which the spacer 15 engages with the side surface of the groove 16. The front surface 11a of the LC panel 11 opposes the rear surface 12a of the front frame 12 with a gap d2 disposed therebetween. The rear surface 11b of the LC panel 11 opposes the front surface 14b of the rear frame 14 with a gap disposed therebetween. In this configuration, the gap d2 denotes the offset distance or clearance between the LC panel 11 and the front frame 12, wherein d1 is longer than d2, whereby the engagement between the spacer 15 and the groove 16 is not released even if the LC panel 11 moves toward the front frame 12 at the maximum.

The situation where the ingress of dust into the LCD device 10 is prevented will be described further with reference to FIG. 3. The dust "B" shown in FIG. 3 may enter the interior of the LCD device 10 through the gap between the front frame 12 and the LC panel 11. The dust B is stopped however by the latch structure configured by the spacer 15 and the groove 16 receiving the spacer 15 at any time. Thus, the dust B cannot reach the rear surface of the LC panel 11 and the irradiation surface 13a of the backlight unit 13.

In the LCD device 10, if an external force such as vibration or shock is applied thereto, the LC panel 11 may move toward the front frame by the clearance d2 in the Z-axis direction. However, the distance d1 by which the spacer 15 engages with the groove 16 is longer than d2. Thus, if the LC panel 11 moves in the Z-axis direction toward the front frame 12, the engagement of the spacer 15 with respect to the groove 16 is maintained at any time, whereby a gap is not provided in the latch structure. Thus, the ingress of dust to the rear surface of the LC panel 11 and irradiation surface 13a of the backlight unit 13 can be prevented, to thereby suppress occurrence of the degradation of image quality of the LCD device 10.

In some case, the LCD device 10 may be fixed onto a housing while the rear frame 14 has been subject to a warp or distortion. In this case, the LCD device 10 is applied with an external force at any time. However, the spacer 15 is not fixed onto the rear frame 14 and engages with the groove 16 while being allowed to move relative to the rear frame 14 in the Z-axis direction. Thus, the warp or distortion is not transferred to the LC panel 11, which is not subject to the influence by the warp or distortion and free from a deformation. As a result, the LCD device 10 is free from the disturbance of light distribution caused by the deformation of the LC panel 11 and thus suppresses degradation of the image quality.

A warp or distortion of the rear frame 14 may be caused by a molding or treatment process during manufacture of the LCD device or caused by heat generated by irradiation of light or change of the ambient temperature during the operation of the LCD device 10. The LC panel 11 may also be subject to a warp or distortion. Even in such a case, the relative movement of the spacer 15 with respect to the groove 16 alleviates the strain or distortion of the LC panel 11, to maintain a superior image quality.

The LCD device 10 does not employ the structure wherein the spacer 15 is compressed to exert a repulsive force and thus clog the gap for preventing the ingress of dust, as in the LCD devices of the Patent Publications. That is, the LC panel is substantially free from an external force except for the weight of itself, the external force degrading the image quality of the LC panel 11.

Second and Third Embodiments

Figure 4:
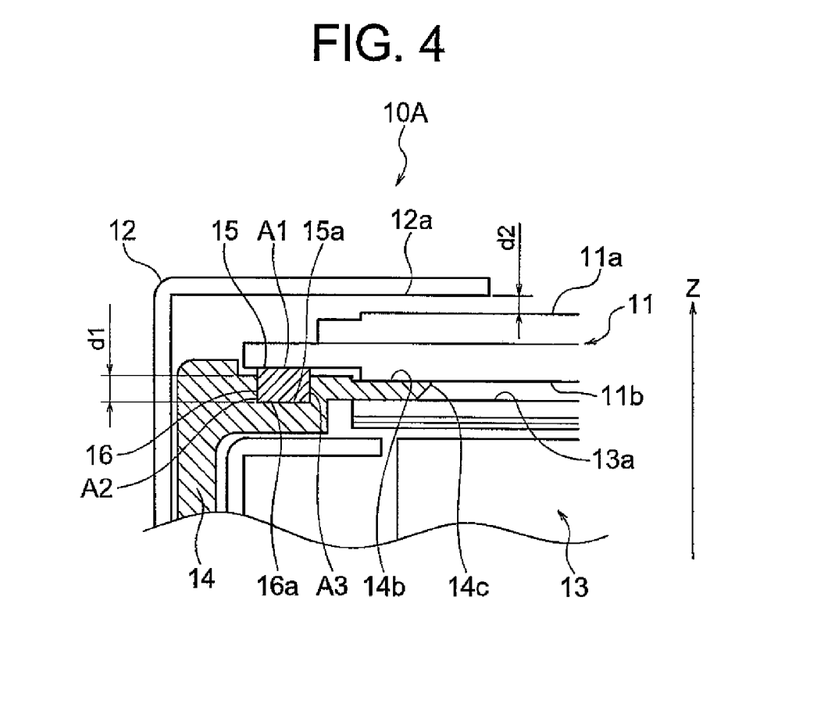
FIG. 4 is a partial cross-sectional view of an LCD device according to a second embodiment of the present invention.

FIG. 4 is cross-sectional view of an LCD device according to a second embodiment of the present invention. The LCD device 10A is similar to the LCD unit 10 of the first embodiment except that the rear surface 11b of the LC panel 11 abuts the front surface 14b of the rear frame 14 when the rear surface 15a of the spacer 15 (top surface of the convex portion) abuts the bottom surface 16a of the groove 16 in the second embodiment. In this structure of the LCD device 10A, the LC panel 11 is supported by the front surface 14b of the rear frame 14 as well as the latch structure configured by the spacer 15 and groove 16.

Due to the above structure in the LCD device 10A, the weight of the LC panel 11 is supported by an area that is larger than the area supporting the LC panel 11 in the first embodiment. In other words, the weight of the LC panel 11 is distributed to a larger supporting area in the present embodiment, thereby reducing strain of the LC panel 11. The reduced strain reduces the change of light distribution in the LC layer and suppresses the irregularity of image. Thus, the LCD device 10A of the present embodiment further improves the image quality.

In the LCD device 10A, even if the LC panel 11 moves toward the front frame 12 due to an external force such as vibration or shock, the length d1 that is larger than the clearance d2 maintains the engagement of the spacer 15 with respect to the groove 16, thereby preventing the ingress of dust.

Figure 5:
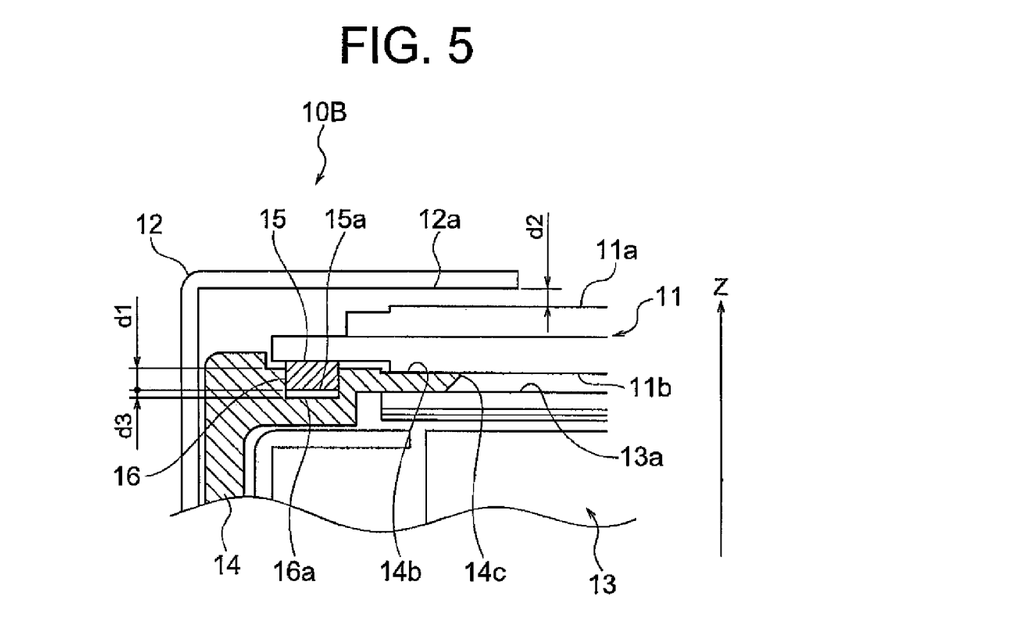
FIG. 5 is a partial cross-sectional view of an LCD device according to a third embodiment of the present invention.

FIG. 5 is a cross-sectional view of an LCD device according to a third embodiment of the present invention. The LCD device 10B of the present embodiment is similar to the LCD device 10A of the second embodiment except that the rear surface 15a of the spacer 15 is apart from the bottom surface 16a of the groove 16 without abutting the same when the rear surface 11b of the LC panel 11 abuts the front surface 14b of the rear frame 14 in the present embodiment.

In the structure of the LCD device 10B, it is not needed to perform an accurate adjustment that allows the rear surface 15b of the spacer 15 to abut the bottom surface 16a of the groove 16 when the rear surface 11b of the LC panel 11 abuts the front surface 14b of the rear frame 14. In addition, the LC panel 11 is supported by the front surface 14b of the rear frame 14 having a larger area than the bottom surface 16a of the groove 16. Thus, the supporting area of the LC panel 11 in the present embodiment is larger than the supporting area of the LC panel 11 in the first embodiment.

The following describes the relationship between the supporting area of the LCD device 10A, 10B and the warp of the LC panel 11. The LC panel 11 is subject to a warp that is concave upward in the Z-axis direction, due to the self weight of the LC panel 11 that is made from a glass plate or transparent substrate, with the center of the LC panel 11 being the bottom of the curvature that starts from the innermost supporting point. The amount of curvature is increased with an increase of the area of the LC panel 11 that is not supported and defined by the innermost supporting point.

In the LCD devices 10A and 10B, the front surface 14b of the rear frame 14 acts as the supporting area, wherein the innermost periphery of the rear frame 14 defines the innermost supporting point of the LC panel 11. Thus, the amount of curvature of the LC panel 11 in the LCD devices 10A and 10B is smaller than that in the LCD device 10 of the first embodiment.

The following describes occurring of the warp in the LC panel 11 that is convex upward as well as concave upward due to the external force such as vibration or shock. As an example, the case where the LCD device 10A shown in FIG. 4 is subject to the external force. In the structure of the LCD device 10A, the rear surface 15b of the spacer 15 abuts the bottom surface 16b of the groove 16 when the rear surface 11b of the LC panel 11 abuts the front surface 14b of the rear frame 14, as described before.

In the LCD 10A, if the LC panel 11 is deformed to have an uneven surface that is convex or concave upward in the Z-axis direction due to the external force, such as vibration or shock, a stress concentration occurs on three surfaces A1, A2 and A3 of the spacer 15 in FIG. 4. If an excessive stress concentration occurs, the LC panel 11 may be deformed whereby the spacer 15 may be possibly peeled off the LC panel 11. Thus, it is preferred that one of the spacer 15 and groove 16 is made from an elastic material for alleviating the stress concentration in the LCD devices 10, 10A and 10B. The elastic material may be any of rubber, silicone and resin foam, for example.

Recently, the LC panel has become larger in size and thicker in the thickness. This makes it important to have a countermeasure that reduces the warp of the LC panel. The structure of the LCD devices 10A and 10B reduces the warp of the LC panel 11 in consideration of the external force causing the warp, as well as the structure of the LCD devices 10A and 10B prevents the ingress of dust.

Fourth Embodiment

Figure 6:
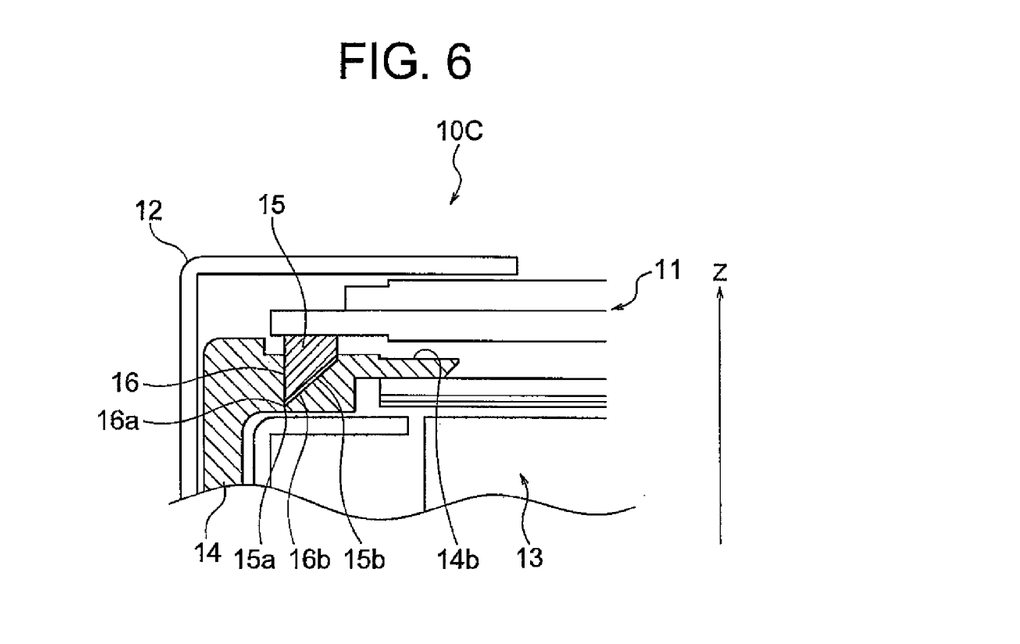
FIG. 6 is a partial cross-sectional view of an LCD device according to a fourth embodiment of the present invention.

FIG. 6 is a cross-sectional view showing an LCD device according to a fourth embodiment of the present invention. The LCD device 10C of the present embodiment is similar to the LCD device 10 except that the spacer 15 has a slanted rear surface 15b in the present embodiment. More specifically, the spacer 15 has a thickness that reduces from the outer periphery to the inner periphery thereof. The groove 16 also has a slanted bottom surface 16b adapted to the slanted rear surface 15b of the spacer 15.

In the LCD device 10C, the slanted rear surface 15b of the spacer 15 reduces the frictional force between the spacer 15 and the groove 16 when the LC panel 11 moves in the Z-axis direction. This reduces the possibility of occurrence of a damage in the LC panel 11 configured by a glass plate etc. The slanted rear surface 15b of the spacer 15 may be employed in the LCD devices 10, 10A and 10B as well.

Fifth Embodiment

Figure 7:
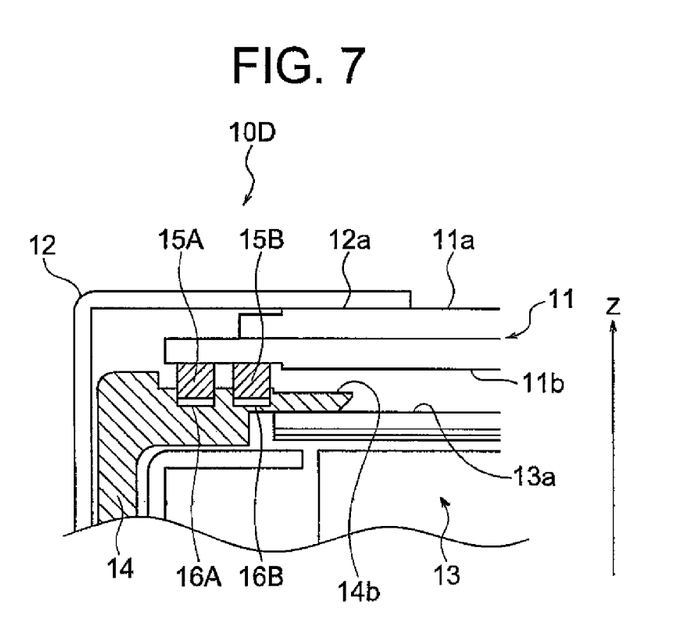
FIG. 7 is a partial cross-sectional view of an LCD device according to a fifth embodiment of the present invention.

FIG. 7 is a cross-sectional view of an LCD device according to a fifth embodiment of the present invention. The LCD device 10D of the present embodiment is similar to the LCD device 10 except that two latch structures, i.e., combinations of spacer 15A and groove 16A and of spacer 15B and groove 16B are provided in the present embodiment. The two latch structures are arranged in a radial direction of the LC panel 11 or in a direction from the center toward the outer periphery of the LC panel 11. In FIG. 7, the depicted situation is such that the LC panel 11 is moved upward to abut the rear surface 12a of the front frame 12 with the rear surface of the spacers 15A and 15B being apart from the bottom surface of the grooves 16A and 16B.

In the LCD device 10D, a plurality of latch structures further reduces the ingress of dust toward the rear surface 11b of the LC panel 11 and the irradiation surface 13a of the backlight unit 13.

Sixth Embodiment

Figure 8:
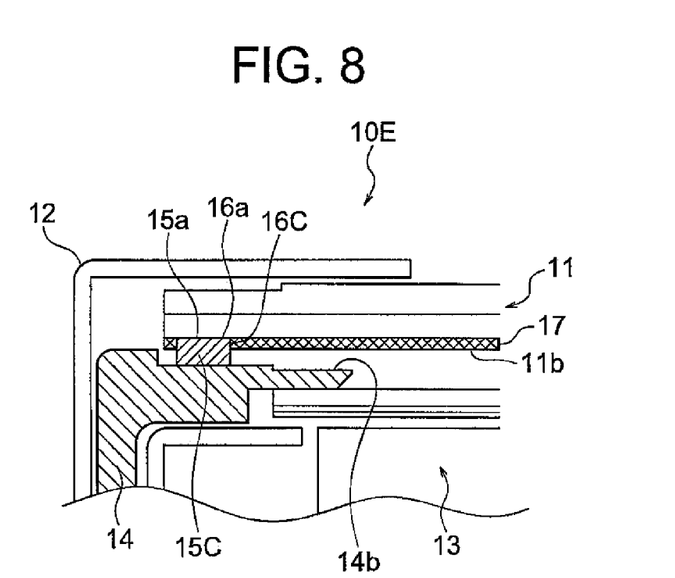
FIG. 8 is a partial cross-sectional view of an LCD device according to a sixth embodiment of the present invention.

FIG. 8 is a cross-sectional view of an LCD device according to a sixth embodiment of the present invention. The LCD device 10E of the present embodiment is similar to the LCD device 10 except that the spacer 15C is fixed onto the front surface 14b of the rear frame 14 and the groove 16C is formed on the rear surface of the LC panel 11 in the present embodiment. The LC panel 11 includes a polarizing film 17 on the rear surface 11b thereof, and the polarizing film 17 has a cutout therein to form the groove 16C on the LC panel 11.

In the LCD device 10E, the front surface 15a of the spacer 15C abuts the rear surface 11b of the LC panel 11 configured by a glass substrate when the spacer 15C is received in the groove 16C. In an alternative, the LC panel 11 may have a groove 16C formed on the body itself of the glass substrate or any other member of the LC panel 11 so long as the groove 16C receives therein the spacer 15C. For example, the spacer 16C may be formed by removing the polarizing film 17 partly in the thickness direction and the spacer 15C may abut the remaining portion of the polarizing film 17.

In the present embodiment, although the polarizing film 17 is exemplified for forming the groove therein, the groove 16C may be formed in another film underlying the LC panel 11. The another film may be another optical film that is any of a retardation film, an antireflection film and irradiation-assist film, for example. If those optical films are stacked one on another, at least one of the optical films may be removed for forming the groove 15C. In a further alternative, the LC panel 11 may have another member other than the optical film, the another member having a groove therein 16C.

Seventh Embodiment

Figure 9:
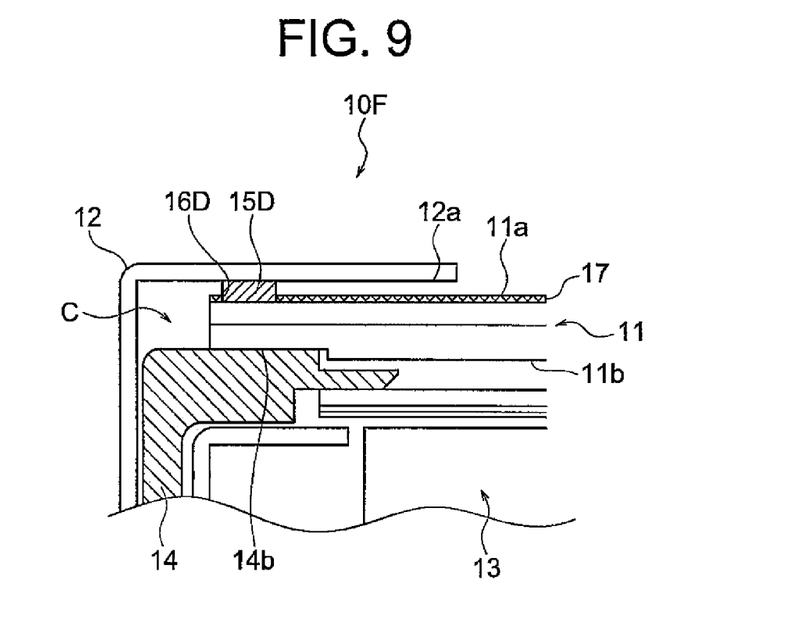
FIG. 9 is a partial cross-sectional view of an LCD device according to a seventh embodiment of the present invention.

FIG. 9 is a cross-sectional view of an LCD device according to a seventh embodiment of the present invention. The LCD device 10F of the present embodiment is similar to the LCD device 10E of the sixth embodiment except that the spacer 15D is fixed onto the rear surface 12a of the front frame 12 and the groove 16D is formed on the front surface 11a of the LC panel 11. The LC panel 11 includes a polarizing film 17 on the front surface of the LC panel 11, the polarizing film 17 having a cutout thereon to form the groove 16D in the present embodiment. The spacer 15D may be formed on the rear surface 12a of the front frame 12 as a unitary body with the front frame 12.

In the LCD device 10F of the present embodiment, the bottom surface 11b of the LC panel 11 abuts the front surface 14b of the rear frame 14 when the spacer 15D is received in the groove 16D. This allows the spacer 15D to be received in the groove 16D at any time, to thereby prevent then ingress of dust into the area defined by the front frame 12, LC panel 11 and rear frame 14.

In the LCD device 10F of the present embodiment, the latch structure prevents the ingress of dust, to suppress occurring of a short-circuited failure such as between input terminals of the LC panel 11 by especially preventing of the ingress of conductive dust.

Eighth Embodiment

Figure 10:
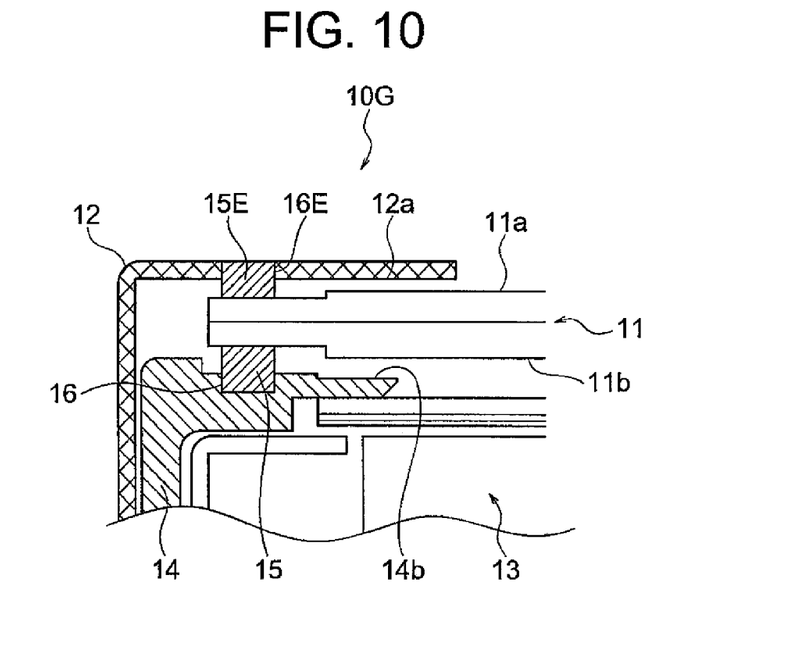
FIG. 10 is a partial cross-sectional view of an LCD device according to an eighth embodiment of the present invention.

FIG. 10 is a cross-sectional view of an LCD device according to an eighth embodiment of the present invention. The LCD device 10G of the present embodiment is similar to the LCD device 10 except that the latch structure is formed between the front frame 12 and the LC panel 11 and between the LC panel 11 and the rear frame 14. The spacer 15 is fixed onto the rear surface 11b of the LC panel 11, whereas the groove 16 receiving therein the spacer 15 is formed on the front surface 14b of the rear frame 14. In addition, another spacer 15E is formed on the front surface 11a of the LC panel 11, whereas another groove 16E receiving therein the another spacer 15E is formed on the rear surface 12a of the front frame 12.

In the LCD device 10G of the present embodiment, both the latch structures prevent the ingress of dust into the LCD device 10G, thereby further suppressing degradation of the image quality caused by the ingress of dust.

While the invention has been particularly shown and described with reference to exemplary embodiment thereof, the invention is not limited to these embodiments and modifications. As will be apparent to those of ordinary skill in the art, various changes may be made in the invention without departing from the spirit and scope of the invention as defined in the appended claims.

The invention claimed is:

1. A liquid crystal display (LCD) device comprising:
   a liquid crystal (LC) panel;
   front and rear frames sandwiching therebetween said LC panel; and
   at least one latch structure engaging together said LC panel and said rear frame,
   wherein said latch structure includes i) a convex portion, ii) an adhesive layer that fixes the convex portion onto a surface of said LC panel opposing said rear frame such that the convex portion is fixed onto the surface of said LC panel opposing said rear frame via the adhesive layer, and iii) a concave portion formed on said rear frame, opposite interior side surfaces of said concave portion sandwiching corresponding opposite exterior sides of said convex portion,
   wherein said concave portion is composed of exactly one groove,
   wherein said convex portion is a rectangular frame-shaped spacer, and where the spacer is located along an inner periphery of said rear frame, and
   wherein, upon application of an external force to said LC panel, said latch structure, a state in which said convex portion is sandwiched by said interior side surfaces of said concave portion, allows movement of said LC panel with respect to said rear frame in a first direction normal to said LC panel such that a distance between a top of said convex portion and a bottom surface of said concave portion changes in the first direction, and restricts movement of said LC panel in a second direction parallel to said LC panel, respectively.

2. The LCD device according to claim 1, wherein a gap is formed between said LC panel and said rear frame when a top of said convex portion abuts a bottom surface of said concave portion.

3. The LCD device according to claim 2, wherein said convex portion has a tapered rear surface such that a thickness of said convex portion reduces from an outer periphery to an inner periphery thereof.

4. The LCD device according to claim 1, wherein a gap is formed between said LC panel and the front frame when a top of said convex portion abuts a bottom surface of said concave portion.

5. The LCD device according to claim 1, wherein said convex portion and a member that configures said concave portion is made of an elastic material.

6. The LCD device according to claim 1, wherein a top of said convex portion abuts a bottom surface of said concave portion, and said LC panel abuts said rear frame.

7. The LCD device according to claim 1, wherein a gap is formed between said LC panel and said rear frame when a top surface of said convex portion abuts a bottom surface of said concave portion.

8. The LCD device according to claim 1, wherein said at least one latch structure include a plurality of latch structures arranged in a direction from a center of said LC panel toward a periphery thereof.

9. The LCD device according to claim 1, wherein said LC panel includes an optical film disposed on at least one of front and rear surfaces thereof, said concave portion is a groove formed on said optical film, and said convex portion is a spacer fixed onto said rear frame.

10. The LCD device according to claim 9, wherein said optical film includes at least one of a polarizing film, an anti-reflection film and a retardation film.

11. The LCD device according to claim 1, wherein said at least one latch structure include a first latch structure formed between said LC panel and one of said front and rear frames and a second latch structure formed between said LC panel and the other of said front and rear frames.

12. The LCD device according to claim 1, wherein,
   a gap is formed between said LC panel and said rear frame when a top of said convex portion abuts a bottom surface of the groove of said concave portion, and
   the spacer of the latch structure being engaged with the groove of said concave portion formed in said rear frame stops an ingress of dust that would enter through the gap between said rear frame and the LC panel, thereby preventing the ingress of dust.

13. The LCD device according to claim 12, wherein,
   the latch structure allows a relative movement of the LC panel with respect to rear frame that alleviates an influence exerted on the LC panel by a distortion of the rear frame.

14. A liquid crystal display device comprising:
   a liquid crystal panel;
   front and rear frames sandwiching therebetween said LC panel; and
   at least one latch structure engaging together said LC panel and said rear frame,
   wherein said latch structure includes i) a convex portion, ii) an adhesive layer that fixes the convex portion onto a surface of said LC panel opposing said rear frame such that the convex portion is fixed onto the surface of said LC panel opposing said rear frame via the adhesive layer, and iii) a concave portion formed on said rear frame, opposite interior side surfaces of said concave portion sandwiching corresponding opposite exterior sides of said convex portion,
   wherein said concave portion is composed of exactly one groove,
   wherein said convex portion is a rectangular frame-shaped spacer, where the spacer is located along an inner periphery of said rear frame,
   wherein a length of a part of said convex portion sandwiched by said interior side surfaces of said concave portion in a first direction normal to said LC panel is longer than an offset distance between said LC panel and said front frame, and wherein, upon application of an external force to said LC panel, said LC panel moves in the first direction such that a distance between a top of said convex portion and a bottom surface of said concave portion changes in the first direction in a state in which said convex portion is sandwiched by said interior surfaces of said concave portion.

15. The LCD device according to claim 14, wherein a gap is formed between said LC panel and said rear frame when a top of said convex portion abuts a bottom surface of said concave portion.

16. The LCD device according to claim 15, wherein said convex portion has a tapered rear surface such that a thickness of said convex portion reduces from an outer periphery to an inner periphery thereof.

17. The LCD device according to claim 14, wherein a gap is formed between said LC panel and the front frame when a top of said convex portion abuts a bottom surface of said concave portion.

18. The LCD device according to claim 14, wherein said convex portion and a member that configures said concave portion is made of an elastic material.

19. The LCD device according to claim 14, wherein a top of said convex portion abuts a bottom surface of said concave portion, and said LC panel abuts said rear frame.

20. The LCD device according to claim 14, wherein a gap is formed between said LC panel and one of said front and rear frames when a top surface of said convex portion abuts a bottom surface of said concave portion.

21. The LCD device according to claim 14, wherein said at least one latch structure include a plurality of latch structures arranged in a direction from a center of said LC panel toward a periphery thereof.

22. The LCD device according to claim 14, wherein said LC panel includes an optical film disposed on at least one of front and rear surfaces thereof, said concave portion is a groove formed on said optical film, and said convex portion is a spacer fixed onto said rear frame.

23. The LCD device according to claim 22, wherein said optical film includes at least one of a polarizing film, an anti-reflection film and a retardation film.

24. The LCD device according to claim 14, wherein said at least one latch structure include a first latch structure formed between said LC panel and one of said front and rear frames and a second latch structure formed between said LC panel and the other of said front and rear frames.

25. The LCD device according to claim 14, wherein, a gap is formed between said LC panel and said rear frame when a top of said convex portion abuts a bottom surface of the groove of said concave portion, and the spacer of the latch structure being engaged with the groove of said concave portion formed in said rear frame stops an ingress of dust that would enter through the gap between said rear frame and the LC panel, thereby preventing the ingress of dust.

26. The LCD device according to claim 25, wherein, the latch structure allows a relative movement of the LC panel with respect to rear frame that alleviates an influence exerted on the LC panel by a distortion of the rear frame.

27. A liquid crystal display (LCD) device, comprising:

a liquid crystal (LC) panel;

front and rear frames sandwiching therebetween said LC panel; and at least one latch structure engaging together said LC panel and said rear frame, wherein said latch structure includes i) a convex portion, ii) an adhesive layer that fixes the convex portion onto a surface of said LC panel opposing said rear frame such that the convex portion is fixed onto the surface of said LC panel opposing said rear frame via the adhesive layer, and iii) a concave portion formed on said rear frame, opposite interior side surfaces of said concave portion sandwiching corresponding opposite exterior side of said convex portion, wherein said concave portion is composed of exactly one groove, wherein said convex portion is a rectangular frame-shaped spacer, where the spacer is located along an inner periphery of said rear frame, wherein said spacer is arranged outside of a display screen of said LC panel, and wherein, upon application of an external force to said LC panel, said latch structure, a state in which said convex portion is sandwiched by said interior side surfaces of said concave portion, allows movement of said LC panel with respect to said rear frame in a first direction normal to said LC panel such that a distance between a top of said convex portion and a bottom surface of said concave portion changes in the first direction, and restricts movement of said LC panel in a second direction parallel to said LC panel, respectively.

* * * * *